US009228862B2

(12) United States Patent
Lee

(10) Patent No.: US 9,228,862 B2
(45) Date of Patent: Jan. 5, 2016

(54) STRUCTURE FOR ULTRASONIC TRANSDUCER

(71) Applicant: MANDO CORPORATION, Pyeongtaek-si, Gyeonggi-do (KR)

(72) Inventor: Gon Jae Lee, Yongin-si (KR)

(73) Assignee: MANDO CORPORATION, Pyeongtaek-Si, Gyeonggi-Do (KR)

(*) Notice: Subject to any disclaimer, the term of this patent is extended or adjusted under 35 U.S.C. 154(b) by 4 days.

(21) Appl. No.: 14/012,670

(22) Filed: Aug. 28, 2013

(65) Prior Publication Data
US 2014/0060180 A1  Mar. 6, 2014

(30) Foreign Application Priority Data
Aug. 28, 2012 (KR) ........................ 10-2012-0094559

(51) Int. Cl.
G01F 1/66 (2006.01)
G01D 11/24 (2006.01)
G01H 11/08 (2006.01)

(52) U.S. Cl.
CPC .............. *G01D 11/245* (2013.01); *G01H 11/08* (2013.01)

(58) Field of Classification Search
CPC .................................................... G01F 1/66
USPC ............................................ 73/431, 861.18
See application file for complete search history.

(56) References Cited

U.S. PATENT DOCUMENTS

| 8,276,445 B2* | 10/2012 | Reiche ................... G10K 9/122 73/430 |
| 2005/0109368 A1* | 5/2005 | Goodson ............... B06B 1/0611 134/1 |

(Continued)

FOREIGN PATENT DOCUMENTS

| CN | 101529272 A | 9/2009 |
| KR | 2012-0059196 A | 6/2012 |

OTHER PUBLICATIONS

Korean Office Action issued in corresponding Korean Application No. 10-2012-0094559 dated Mar. 11, 2014.

(Continued)

*Primary Examiner* — Lisa Caputo
*Assistant Examiner* — Jamel Williams
(74) *Attorney, Agent, or Firm* — McDermott Will & Emery LLP

(57) ABSTRACT

Provided is an ultrasonic transducer including: a housing including a bottom surface and side members, the side members facing each other and extending upwardly with a space part therebetween, the housing having an opened upper part; a piezoelectric resonator disposed at an upper portion of the bottom surface; a housing auxiliary member disposed at upper portions of the side members and inserted into the space part; and a signal connection pin part disposed at an upper portion of the housing auxiliary member. In particular, the housing auxiliary member is formed of material having a lower density than the housing, thereby improving isotropic radiation characteristics. Sides of the housing are symmetrically opened by a structure for the ultrasonic transducer so that an isotropic radiation angle of ultrasonic waves is maximized to improve accuracy of sensing an obstacle, an internal structure of the housing is simplified in such a way that no additional process is required, thereby reducing manufacturing cost, and the housing auxiliary member is combined with the opened part of the housing so that external pollution can be prevented from entering into the ultrasonic transducer.

5 Claims, 7 Drawing Sheets

(56) References Cited

U.S. PATENT DOCUMENTS

| | | | |
|---|---|---|---|
| 2010/0296692 A1* | 11/2010 | Reiche | H04R 31/00 381/423 |
| 2013/0167654 A1* | 7/2013 | Ueberschlag | G01F 1/662 73/861.18 |

OTHER PUBLICATIONS

Chinese Office Action issued in Chinese Application No. 201310378887.3 dated Jun. 30, 2015.

* cited by examiner

STRUCTURE FOR ULTRASONIC TRANSDUCER

CROSS-REFERENCE TO RELATED APPLICATION

This application claims priority to and the benefit of Korean Patent Application No. 10-2012-0094559 filed on Aug. 28, 2012, the disclosure of which is incorporated herein by reference in its entirety.

BACKGROUND

1. Field of the Invention

The present invention relates to an ultrasonic transducer, and more particularly, to an ultrasonic transducer that is capable of sensing an obstacle at the periphery of a vehicle.

2. Discussion of Related Art

Ultrasonic transducers that are used in vehicles, according to the related art, are mounted in bumpers of vehicles and used as obstacle sensors.

In ultrasonic transducers used for this purpose, if a transmission and reception range of ultrasonic waves in a horizontal installation direction is extremely narrow, blind spots are formed in the range of detection. Also, if the transmission and reception range of the ultrasonic waves in a vertical direction is extremely wide, waves reflected from the ground become noise. Thus, horizontal rather than vertical directivity is required.

In order to obtain such directivity, directivity has been generally improved by forming slits that are symmetrical to sides of a housing of an ultrasonic transducer.

However, in the case of such a configuration, foreign substances are introduced from the outside through slits formed in sides of the housing, and the introduced foreign substances accumulate on the periphery of a piezoelectric resonator, which lowers performance of the ultrasonic transducer. Also, due to complexity of the structure of the housing, processing including forging and cutting needs to be generally performed on the housing formed of an aluminum material such that manufacturing cost increases.

SUMMARY OF THE INVENTION

The present invention is directed to an ultrasonic transducer having a structure in which directivity is realized and external foreign substances are not introduced into the ultrasonic transducer.

Problems solved by the present invention are not limited to the above-mentioned matters, and other unmentioned problems will be clearly understood by one of skill in the art from the following description.

According to an aspect of the present invention, there is provided an ultrasonic transducer including: a housing comprising a bottom surface and side members, the side members facing each other and extending upwardly with a space part therebetween, the housing having an opened upper part; and a housing auxiliary member disposed at upper portions of the side members and inserted into the space part, wherein the housing auxiliary member is formed of material having a lower density than the housing.

The housing auxiliary member may be formed of a non-metal material including plastic.

A stepped part may be formed by recessing the side members from top ends of the side members to the bottom surface, and a protrusion corresponding to the stepped part may be formed at the housing auxiliary member so as to be combined with the stepped part.

At least one groove may be formed in an upper portion of the housing auxiliary member, and protrusions corresponding to the at least one groove may be provided at a signal connection pin part to be combined with the at least one groove.

The housing and the housing auxiliary member may be combined with each other using one of epoxy bonding, indentation, key way combination, and groove combination.

As described above, in an ultrasonic transducer according to the present invention, an isotropic radiation angle of ultrasonic waves is maximized to improve accuracy of sensing an obstacle at the periphery of a vehicle and to reduce processing cost of a housing. Furthermore, a housing auxiliary member is inserted into and combined with the housing so that introduction of pollution can be prevented and degradation of performance of the ultrasonic transducer can be prevented.

The effects of the present invention are not limited to the above-mentioned matters, and other unmentioned effects will be clearly understood by one of skill in the art from the following description.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of a structure for an ultrasonic transducer according to the present invention will be described in detail below with reference to the accompanying drawings.

Figure 1:
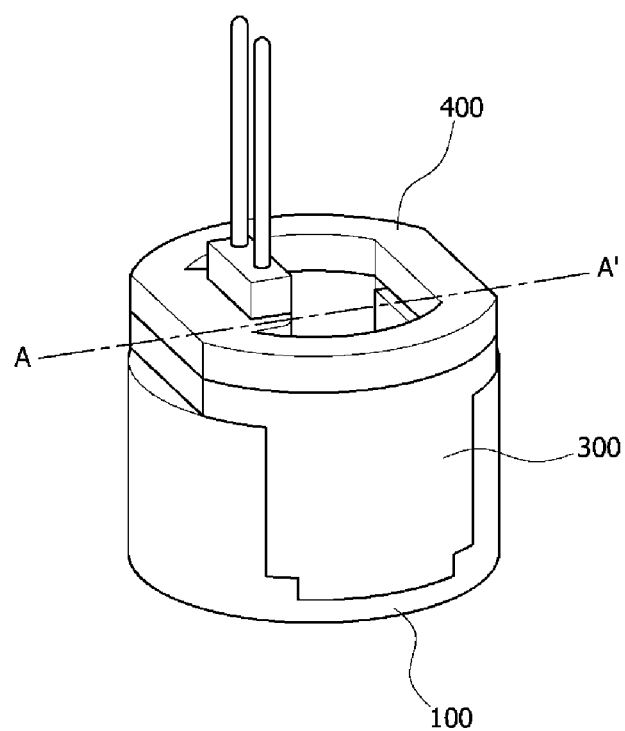
FIG. 1 is a perspective view illustrating a combined state of a structure for an ultrasonic transducer according to an embodiment of the present invention.
Figure 2:
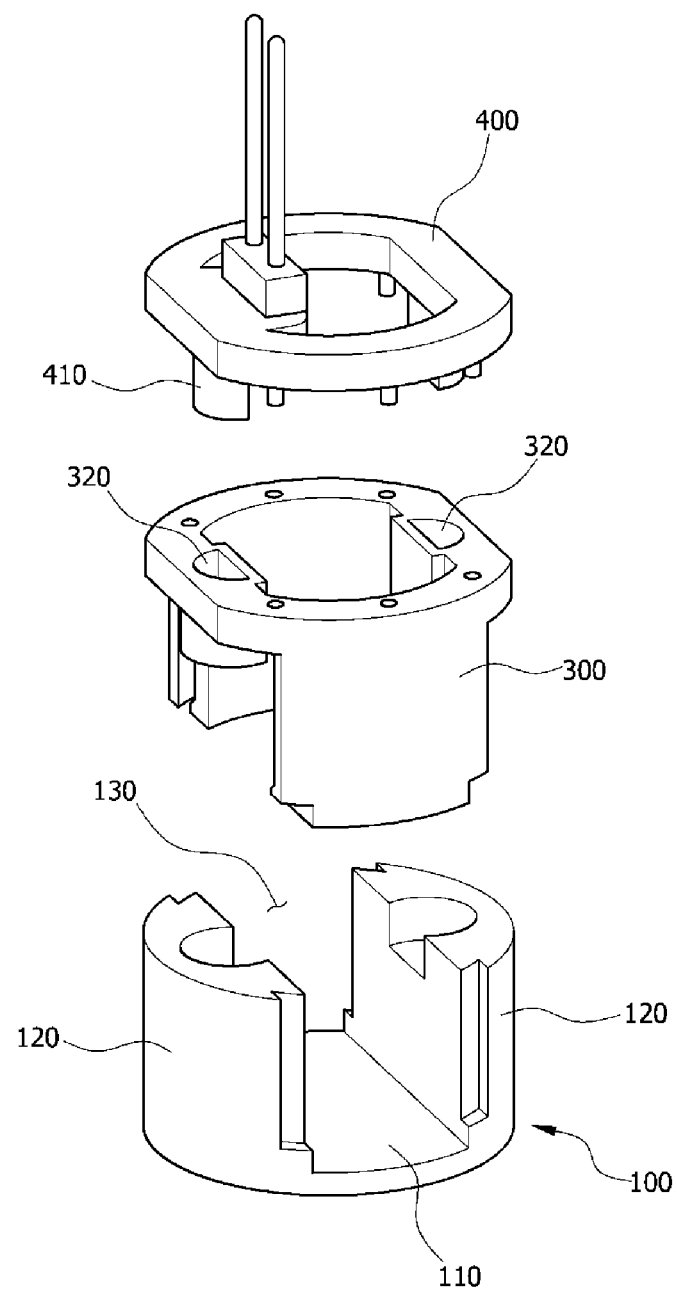
FIG. 2 is an exploded perspective view illustrating the structure of an ultrasonic transducer illustrated in FIG. 1.

FIG. 1 is a perspective view illustrating a combined state of a structure of an ultrasonic transducer according to an embodiment of the present invention, and FIG. 2 is an exploded perspective view illustrating the structure of an ultrasonic transducer illustrated in FIG. 1.

A housing 100 of the ultrasonic transducer according to an embodiment of the present invention includes a bottom surface 110 and side members 120. A space part 130 is formed between the side members 120, a piezoelectric resonator (see 200 of FIG. 5) is disposed at an upper portion of the bottom surface 110, a housing auxiliary member 300 that is formed of material having a lower density than the housing 100 is positioned at upper portions of the side members 120, and a signal connection pin part 400 is disposed at an upper portion of the housing auxiliary member 300.

An angular structure of the ultrasonic transducer will now be described in detail with reference to FIG. 2. The housing 100 includes the side members 120 that face each other and extend upwardly. The space part 130 is formed between the side members 120 such that a structure of the housing 100 is configured to penetrate the ultrasonic transducer and be opened in both side directions.

Thus, even when the size of the ultrasonic transducer is limited and the size of a radiation surface is limited, isotropic radiation patterns are effectively obtained.

The following Table 1 shows directivity according to whether or not sides of the housing 100 are opened.

TABLE 1

|  | Vertical radiation angle | Horizontal radiation angle |
| --- | --- | --- |
| Structure in which space part is formed | −45°~+45° | −40°~+40° |
| Structure in which no space part is formed | −20°~+20° | −40°~+40° |

Figure 3:
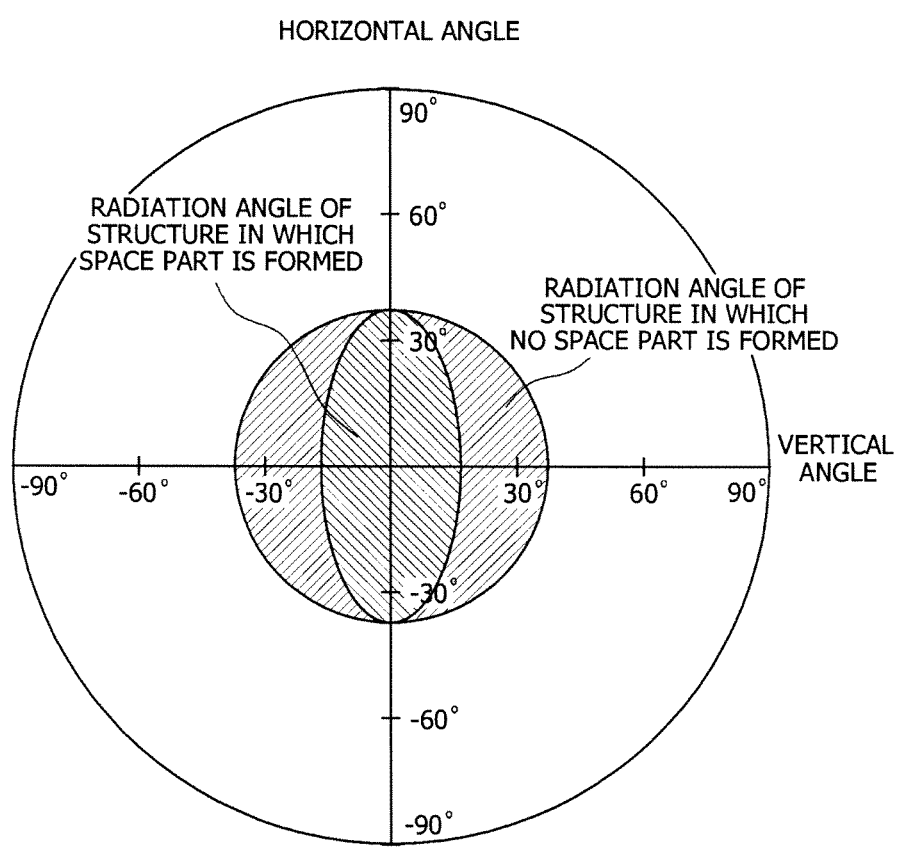
FIG. 3 is a view illustrating directivity of a radiation angle that is formed when the structure for the ultrasonic transducer of FIG. 1 is used.

In the case of the housing 100 in which no space part is formed, a vertical radiation angle is formed between −20° and +20° and a horizontal radiation angle is formed between −40° and +40°. In the case of the housing 100 in which a space part is formed, the vertical radiation angle is formed between −45° and +45° and the horizontal radiation angle is formed between −40° and +40°. Thus, it can be confirmed that the structure having the space part has excellent isotropic characteristics compared to the structure having no space part, and this is also confirmed through directivity of both structures shown in FIG. 3.

The housing auxiliary member 300 is disposed at upper portions of the side members 120 and inserted into the space part 130 of the housing 100, thereby performing a function of preventing introduction of contaminants into the ultrasonic transducer. The housing auxiliary member 300 needs to be formed of material having a lower density than the housing 100 so as to prevent a change in sensitivity characteristics of the ultrasonic transducer due to insertion of the housing auxiliary member 300.

Figure 4:
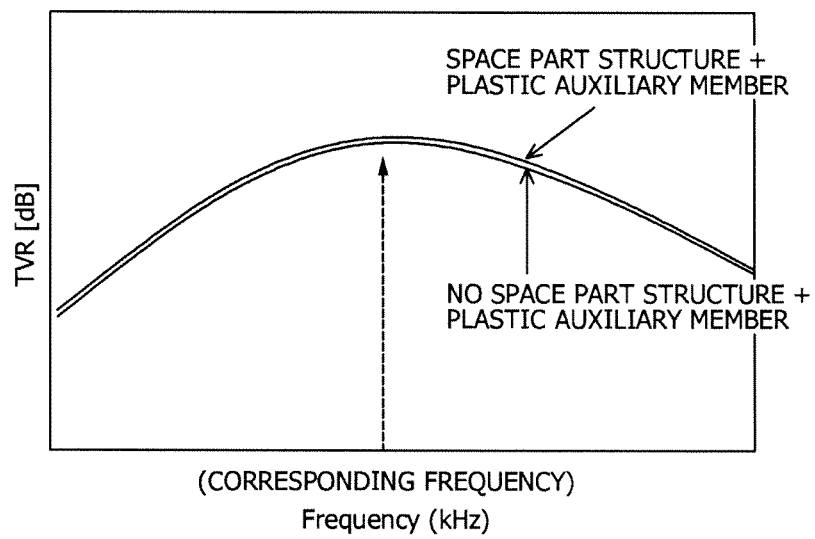
FIG. 4 is a view illustrating sensitivity characteristics that are obtained when the structure for the ultrasonic transducer of FIG. 1 is used.

FIG. 4 is a graph showing sensitivity characteristics according to whether or not the housing auxiliary member 300 formed of plastic is inserted into the housing 100 in which a space part is formed and which is formed of aluminum.

Plastic has a density of 0.9 g/cm³ to 1.5 g/cm³, which is lower than the density (2.7 g/cm³) of aluminum used in forming the housing 100. In this case, as shown in FIG. 4, the effect of insertion of the housing auxiliary member 300 on sensitivity characteristics may be very small. Due to these characteristics, a structure for an ultrasonic transducer in which directivity is realized and external foreign substances are not introduced into the ultrasonic transducer can be provided.

As mentioned above, the housing auxiliary member 300 needs to be formed of material having a lower density than the housing 100, and may be formed of, in particular, a non-metal material including plastic.

Figure 5:
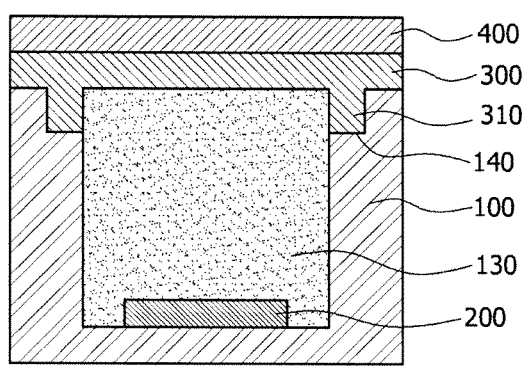
FIG. 5 is a cross-sectional view taken along a line A-A of FIG. 1 according to a first embodiment of the present invention.
Figure 6:
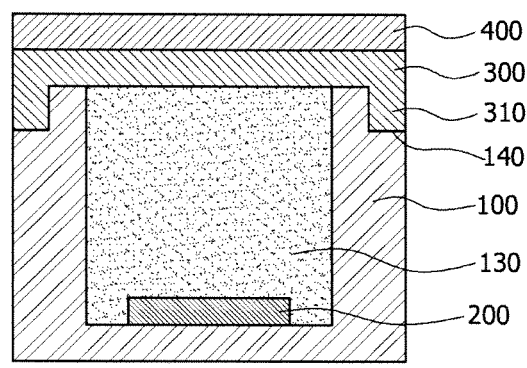
FIG. 6 is a cross-sectional view taken along a line A-A of FIG. 1 according to a second embodiment of the present invention.
Figure 7:
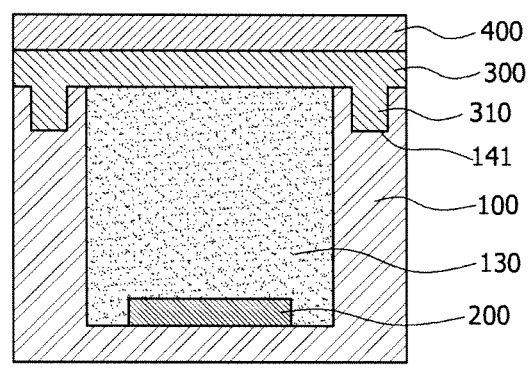
FIG. 7 is a cross-sectional view taken along a line A-A of FIG. 1 according to a third embodiment of the present invention.

FIGS. 5, 6, and 7 are cross-sectional views illustrating various embodiments related to combination of the housing 100 and the housing auxiliary member 300 of the ultrasonic transducer according to the present invention.

The housing auxiliary member 300 is disposed at upper portions of the side members 120 of the housing 100 and combined with the housing 100. In this case, a stepped part 140 may be formed at one side of a cross-section of the side members 120 of the housing 100 by recessing the side members 120 from top ends of the side members 120 to the bottom surface 110, and a protrusion 310 corresponding to the stepped part 140 formed at the housing 100 may be formed at the housing auxiliary member 300 so as to be combined with the stepped part 140. FIG. 5 illustrates an embodiment in which the stepped part 140 of the housing 100 is formed at an inner side of each of the side members 120, and FIG. 6 illustrates an embodiment in which the stepped part 140 of the housing 100 is formed at an outer side of each of the side members 120.

Also, an uneven part 141 having an uneven shape may be formed at an upper portion of each of the side members 120 so as to combine the housing 100 and the housing auxiliary member 300 with each other, as illustrated in FIG. 7.

By mutually combining the stepped part 140, the uneven part 141, and the protrusion 310, the housing 100 and the housing auxiliary member 300 may be precisely and firmly fastened to each other and may be easily assembled.

In this case, the housing 100 and the housing auxiliary member 300 may be combined with each other using indentation, key way combination, or group combination.

Combination between the housing 100 and the housing auxiliary member 300 may be performed by coating an epoxy bond or using indentation so that the housing 100 and the housing auxiliary member 300 may not be easily separated from each other due to an external shock.

Referring to FIG. 2, at least one groove 320 is formed in an upper portion of the housing auxiliary member 300, and protrusions 410 corresponding to grooves 320 are formed at the signal connection pin part 400 to be combined with the grooves.

The grooves 320 and the protrusions 410 may be provided in plural and may be disposed symmetrically opposite to each other in a horizontal or vertical direction.

In this case, combination between the housing auxiliary member 300 and the signal connection pin part 400 becomes more solid, and assembly characteristics of the ultrasonic transducer can also be improved.

It will be apparent to those skilled in the art that various modifications can be made to the above-described exemplary embodiments of the present invention without departing from the spirit or scope of the invention. Thus, it is intended that the present invention cover all such modifications provided they fall within the scope of the appended claims and their equivalents.

What is claimed is:

1. An ultrasonic transducer comprising:
   a housing comprising a bottom surface and side members, the side members facing each other and extending upwardly with a space part therebetween, the housing having an opened upper part; and
   a housing auxiliary member disposed at upper portions of the side members and inserted into the space part,
   wherein the housing auxiliary member is formed of material having a lower density than the housing.

2. The ultrasonic transducer of claim 1, wherein the housing auxiliary member is formed of a non-metal material including plastic.

3. The ultrasonic transducer of claim 1, wherein a stepped part is formed by recessing the side members from top ends of the side members to the bottom surface, and a protrusion corresponding to the stepped part is formed at the housing auxiliary member so as to be combined with the stepped part.

4. The ultrasonic transducer of claim 1, wherein the housing and the housing auxiliary member are combined with each other using epoxy bonding or indentation.

5. The ultrasonic transducer of claim 1, wherein at least one groove is formed in an upper portion of the housing auxiliary member, and protrusions corresponding to the at least one groove are provided at a signal connection pin part to be combined with the at least one groove.

\* \* \* \* \*